United States Patent [19]

Sugiyama et al.

[11] Patent Number: 4,667,318
[45] Date of Patent: May 19, 1987

[54] DATA PRODUCING DEVICE IN A SIGNAL REPRODUCING APPARATUS

[75] Inventors: Hiroyuki Sugiyama, Isehara; Makoto Komura, Tokyo; Isao Masuda, Sagamihara; Kazunori Nishikawa, Machida; Yoshiki Iwasaki, Yokohama, all of Japan

[73] Assignee: Victor Company of Japan, Ltd., Japan

[21] Appl. No.: 543,402

[22] Filed: Oct. 19, 1983

[30] Foreign Application Priority Data

Oct. 21, 1982 [JP] Japan .................................. 57-185244
Oct. 21, 1982 [JP] Japan .................................. 57-185245

[51] Int. Cl.$^4$ .......................... H04N 5/76; G11B 5/02
[52] U.S. Cl. ........................................ 369/59; 360/27; 360/51; 371/47
[58] Field of Search .................................. 369/59, 33; 358/341-343; 360/32, 27, 51; 365/215, 234; 371/47

[56] References Cited

U.S. PATENT DOCUMENTS

| | | | |
|---|---|---|---|
| 4,099,259 | 7/1978 | Parsons et al. | 364/900 |
| 4,188,616 | 2/1980 | Kazami et al. | 371/37 |
| 4,477,842 | 10/1984 | Kaneko | 369/59 X |
| 4,486,780 | 12/1984 | Iuc | 358/160 |
| 4,488,182 | 12/1984 | Takahashi et al. | 358/342 X |
| 4,499,506 | 2/1985 | Takahashi et al. | 358/342 X |

FOREIGN PATENT DOCUMENTS

2495871 of 0000 France .
1176689 1/1970 United Kingdom .
1529842 10/1978 United Kingdom .
2091021 7/1982 United Kingdom .

Primary Examiner—Aristotelis M. Psitos
Attorney, Agent, or Firm—Andrus, Sceales, Starke & Sawall

[57] ABSTRACT

A data producing device in a signal reproducing apparatus, comprises a shift register supplied with synchronizing signals and codes which are time-sequentially reproduced from a recording medium, synchronizing signal detectors supplied with the synchronizing signals from the shift register, data transfer circuits provided in parallel with respect to each other and in series with the synchronizing signal detectors, and a control circuit for controlling the data transfer circuits so that a data is selectively read out and produced from a desired data transfer circuit among the plurality of data transfer circuits. The reproduced synchronizing signals and codes are transferred to the shift register and are read out from the shift register in response to a clock pulse having a predetermined frequency. The number of the synchronizing signal detectors is equal to the number of kinds of the synchronizing signals, and the synchronizing-signal detectors are provided in parallel with respect to each other. Each of the synchronizing signal detectors detect a specific synchronizing signal. A data in a predetermined code among the codes supplied to the data transfer circuits is transferred to the data transfer circuits, when a synchronizing signal for discriminating the predetermined code is detected in the synchronizing signal detectors and supplied to the data transfer circuits.

5 Claims, 11 Drawing Figures

DATA PRODUCING DEVICE IN A SIGNAL REPRODUCING APPARATUS

BACKGROUND OF THE INVENTION

The present invention generally relates to data producing devices in signal reproducing apparatuses, and more particularly to a data producing device which is designed so that a desired data among a plurality of kinds of data which are reproduced from a recording medium in the signal reproducing apparatus, can be produced immediately according to a demand.

Generally, systems for recording and reproducing information signals onto and from a rotary recording medium (hereinafter simply referred to as a disc) have been reduced to practice According to such systems, an analog information signal such as a video signal and an audio signal is subjected to digital pulse modulation such as a pulse code modulation (PCM), and the digital information signal is recorded onto the disc as variations in geometrical configuration consisting of rows of intermittent pits. The recorded signal is reproduced from the disc by detecting the variations in the intensity of light which is reflected from the disc or variations in electrostatic capacitance which is formed between the disc and a reproducing element.

Among the discs of the type described above, there is a disc which is recorded with a plurality of channels of audio signals, and a video signal which is used as a supplementary information which makes the listening more pleasurable upon reproduction of the audio signal. The audio signal and the video signal are recorded on the disc in terms of one frame (one block), together with synchronizing signals, error correcting codes, and an address signal. Upon reproduction, an address signal which is related to programs, is formed based on address bits which are obtained from each of a predetermined number of blocks, and an address data in this address signal is produced according to a demand.

Conventionally, only a single holding circuit was provided in a data producing circuit of the signal reproducing apparatus. The single holding circuit was designed to produce an address data in response to a clock pulse, every time there was a demand for an address data to be produced. Hence, when there was a demand for a desired address data, among a plurality of kinds of address data, to be produced, the desired address data could not be produced immediately. That is, other address data had to be produced successively until the desired address data was produced. In addition, when there was an error in the reproduced desired address data which was to be produced, a series of subsequent address data had to be reproduced first, and the desired address data sometimes could not be reproduced. Further, there was a disadvantage in that an address data different from the address data which was being displayed on an indicator, could not be produced simultaneously.

SUMMARY OF THE INVENTION

Accordingly, it is a general object of the present invention to provide a novel and useful data producing device in a signal reproducing apparatus, in which the above described disadvantages have been overcome.

Another and more specific object of the present invention is to provide a data producing device in a signal reproducing apparatus, which is capable of immediately producing a desired address data according to a demand, by providing the same number of data holding circuits as the number of kinds of address data. According to the present invention, a preceding data is always available even when an error exists in the reproduced address data because the address data are successively held in each of the data holding circuits, and it is always possible to produce correctly the desired address data. In addition, while one address data is obtained from one data holding circuit and being displayed, for example, it is also possible to obtain another address data from another data holding circuit. This means that while the one address data is being displayed, a search operation can be carried out to move a reproducing element to a location on a disc which is indicated by the other address data.

Other objects and further features of the present invention will be apparent from the following detailed description when read in conjunction with the accompanying drawings.

DETAILED DESCRIPTION

Figure 1:
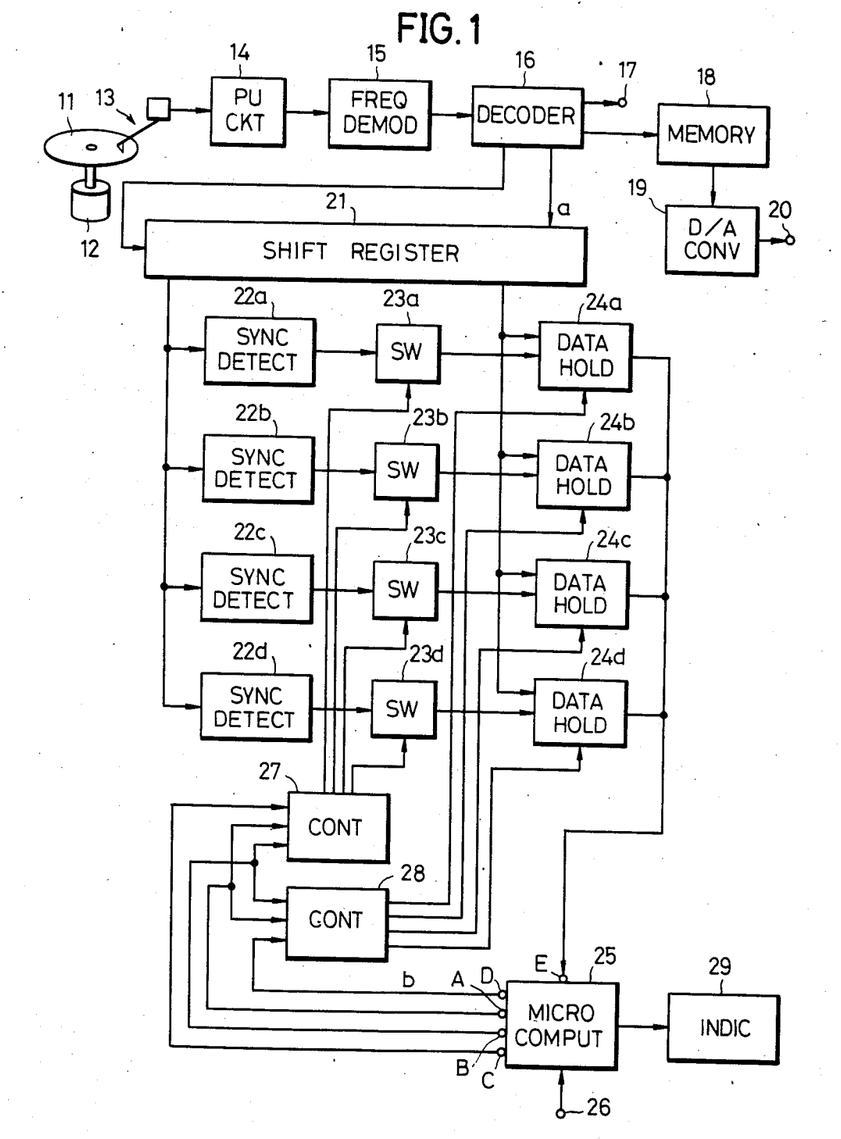
FIG. 1 is a systematic block diagram showing a first embodiment of a data producing device according to the present invention, together with a reproducing system for reproducing signals from a disc.

In FIG. 1, a digital audio signal which is obtained by subjecting an audio signal to a digital pulse modulation, and a digital video signal which is obtained by subjecting a video signal related to a still picture to a digital pulse modulation, for example, are respectively frequency modulated and recorded on the same track on a disc 11 as rows of intermittent pits. The video signal is used as a supplementary information which makes the listening more pleasurable upon reproduction of the audio signal.

The disc 11 is rotated by a motor 12, and the signals recorded on the disc 11 are reproduced by a pickup device 13. This pickup device 13 may be an electrostatic capacitance type pickup device which picks up the signal as variations in electrostatic capacitance, or a so-called optical type pickup device which picks up the signal by use of a laser beam.

The signal thus picked up by the pickup device 13 is supplied to a frequency demodulator 15, through a pickup circuit 14 which includes a preamplifier. The picked up signal is thus frequency demodulated at the frequency demodulator 15, and the demodulated digital signal is supplied to a decoder 16 wherein the demodulated digital signal is subjected to modified frequency modulation (MFM) decoding.

Figure 2:
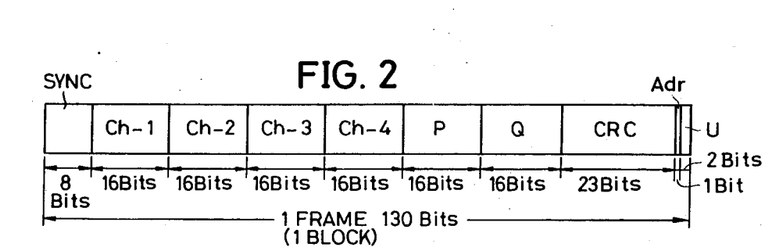
FIG. 2 shows a signal format of one frame (one block) of a digital signal which is recorded on the disc.

The reproduced digital signal which is subjected to the MFM decoding in the decoder 16, has a signal format shown in FIG. 2. FIG. 2 shows one frame (that is, one block) of the reproduced digital signal. As shown, one block comprises 130 bits. In FIG. 2, synchronizing signal bits having an 8-bit fixed pattern for indicating the beginning of a block, are indicated by SYNC. 16-bit 4-channel digital information signals are respectively indicated by Ch-1 through Ch-4. Ch-1 through Ch-4 indicate a multiplexed position of one word of the signal in each channel, where three (or two) channels contain digital audio signals and one (or two) channel contains a digital video signal, the four channels contain two kinds of 2-channel digital audio signals, or the four channels contain a 4-channel digital audio signal, for example. Picture element data in one horizontal scanning line are made up of 684 words. In the present embodiment, the channels Ch-1 through Ch-3 contain the digital audio signals and the channel Ch-4 contains the digital video signal. Further, 16-bit error correcting codes are indicated by P and Q. These error correcting codes are produced from the 16-bit data from each of the four channels Ch-1 through Ch-4, according to predetermined producing equations. A 23-bit error detecting code is indicated by CRC. This error detecting code CRC is a 23-bit remainder obtained when each of the data (hereinafter referred to as "information data") in the channels Ch-1 through Ch-4 and the error correcting codes P and Q which correspond to the 9-th through the 104-th bit in FIG. 2, is divided by a producing polynomial $x^{23}+x^5+x^4+x+1$, for example. It is detected that there is no error when the remainder is zero. In addition, a bit Adr corresponds to one bit of a 196-bit control signal which is used for operations such as a random access, and this 196-bit control signal is transmitted by 196 blocks of the digital signal. Further, two bits indicated by U in FIG.2 correspond to so-called users' bits which are reserved for possible future use.

One block of the above described digital signal comprising a total of 130 bits from the synchronizing bits SYNC to the users' bits U, has a repetition frequency of 44.1 kHz which is equal to the sampling frequency, for example. The digital signal is recorded onto the disc 11 in series in terms of blocks, with a transmission bit rate of 5.733 Mbit/sec. Accordingly, if the rotational speed of the disc 11 is set at 900 rpm, 2940 blocks of the digital signal will be recorded for one revolution of the disc 11, and the 196-bit control signal described before will be recorded 15 times for one revolution of the disc.

The digital audio signal which is subjected to the MFM decoding, is converted into an analog audio signal in a digital-to-analog (D/A) converter within the decoder 16, and this analog video signal is obtained through an output terminal 17. On the other hand, the digital video signal is written into and read out from a memory 18 according to a control signal from a memory controller (not shown). The digital video signal read out from the memory 18 is converted into an analog video signal in a D/A converter 19, and this analog video signal is obtained through an output terminal 20.

The bits Adr which make up the 196-bit control signal which is used for operations such as the random access, are detected in an address detector within the decoder 16. The bits Adr are obtained in terms of 196 blocks, because each bit of the 196-bit control signal is distributed so that one bit of the 196-bit control signal is transmitted in one block. The bits Adr which are detected in the decoder 16, are converted into the 196-bit control signal having a signal format shown in FIG. 3.

Figure 3:
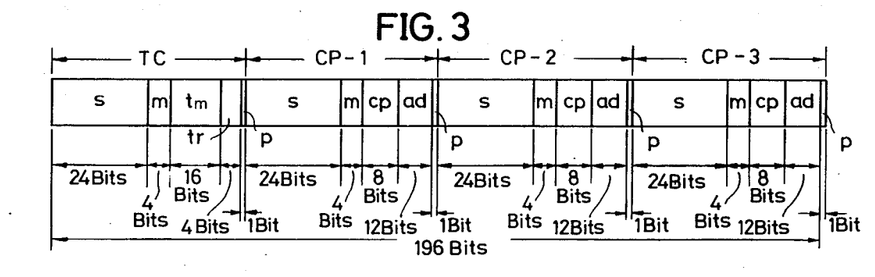
FIG. 3 shows a signal format of a data signal including a plurality of codes which are to be produced by the data producing device of the present invention.

The 196-bit control signal comprises a 49-bit time code TC, a 49-bit first chapter code CP-1, a 49-bit second chapter code CP-2, and a 49-bit third chapter code CP-3. The time code TC indicates the position of the recorded program in terms of a time it takes during a normal reproduction mode to reach this position from the position where the recording of the signal started. The first and second chapter codes CP-1 and CP-2 respectively indicate the program number of the audio program counted from the position where the recording of the audio signal started. The third chapter code CP-3 indicates the program number of the video program counted from the position where the recording of the video signal started.

The time code TC is made up of a 24-bit synchronizing signal S, and an address data part including a 4-bit mode signal m, a 16-bit time signal tm which indicates the time in minutes and seconds, a 4-bit track number signal tr, and a 1-bit parity code p. The first through third chapter codes CP-1 through CP-3 are each made up of a 24-bit synchronizing signal S, and an address data part including a 4-bit mode signal m, an 8-bit chapter signal cp, a 12-bit chapter local address signal ad, and a 1-bit parity code p.

The time code TC and the chapter codes CP-1 through CP-3 which are obtained from the decoder 16, are supplied to a 49-bit shift register 21, and the contents of the shift register 21 are shifted in response to a clock pulse a from the decoder 16. 24 bits among the 49-bit output of the shift register 21, which correspond to the synchronizing signal part of the time code TC and the chapter codes CP-1 through CP-3, are supplied in parallel to synchronizing signal detectors 22a through 22d. The synchronizing signal S in the time code TC is detected in the detector 22a, the synchronizing signal S in the chapter code CP-1 is detected in the detector 22b, the synchronizing signal S in the chapter code CP-2 is detected in the detector 22c, and the synchronizing signal S in the chapter code CP-3 is detected in the detector 22d. These synchronizing signals S detected in the detectors 22a through 22d, are respectively supplied to data holding circuits 24a through 24d, through switching circuits 23a through 23d. The switching circuits 23a through 23d are normally closed.

The remaining 25 bits among the 49-bit output of the shift register 21, which correspond to the address data part of the time code TC and the chapter codes CP-1 through CP-3, are supplied in parallel to the data holding circuits 24a through 24d. The address data parts of the 196-bit control signal shown in FIG. 3 are respectively transferred to the data holding circuits 24a through 24d, when the corresponding synchronizing signals S from the synchronizing signal detectors 22a through 22d are supplied to the data holding circuits 24a through 24d through the switching circuits 23a through 23d. A new address data part is transferred to each of the data holding circuits 24a through 24d, every time a corresponding synchronizing signal S is supplied thereto. Accordingly, the data holding circuits 24a through 24d constantly hold the newest address data parts.

When a random access is to be carried out so as to move the pickup device 13 to a desired position on the disc 11, and in addition, the desired position is to be displayed, a desired time address or chapter address is designated in a microcomputer 25 through a terminal 26. When the desired time or chapter address is designated, the microcomputer 25 produces selection signals through output ports A and B. These selection signals are in accordance with the designated time or chapter address, and are supplied to both a transfer control circuit 27 and a read-out control circuit 28. A request signal which is produced through an output port C of the microcomputer 25 is supplied to the control circuit 27, and a shift clock pulse b produced through an output port D of the microcomputer 25 is supplied to the control circuit 28. The frequency of the clock pulse b is lower than the frequency of the clock pulse a. For example, the frequency of the clock pulse a is 44.1 kHz, and the frequency of the clock pulse b is in the order of 5 kHz.

If the chapter code CP-1 is designated, for example, the control circuit selectively supplies the request signal from the output port C to the switching circuit 23c, according to the selection signals from the output ports A and B. The switching circuit 23c is thus opened by this request signal. As a result, the synchronizing signal S which was detected in the detector 22b is not supplied to the data holding circuit 24b. That is, the address data from the shift register 21 is no longer transferred to the data holding circuit 24b. On the other hand, the control circuit 28 selectively supplies the clock pulse b from the output port D to the data holding circuit 24b, according to the selection signals from the output ports A and B. Hence, the address data in the chapter code CP-1 which was held in the data holding circuit 24b, is read out from the data holding circuit 24b and supplied to the microcomputer 25 through an input port E.

According to the data producing device of the present invention, the data holding circuits 24a through 24d are provided with respect to each of the address data parts in the time code TC and the chapter codes CP-1 through CP-3. Thus, when the read-out of a desired address data is designated, the designated address data will be read out immediately from a corresponding data holding circuit. The pickup device can immediately make access to the designated time or chapter address, and further, the designated time or chapter address can be displayed immediately. In addition, even when an error exists in the reproduced address data which is designated, it is possible to read out the address data because the preceding address data is held in the data holding circuit. While the address data is read out from the data holding circuit, the synchronizing signal is not supplied to this data holding circuit from a corresponding synchronizing signal detector, and the transfer of address data from the shift register to this data holding circuit is prohibited.

Figure 4:
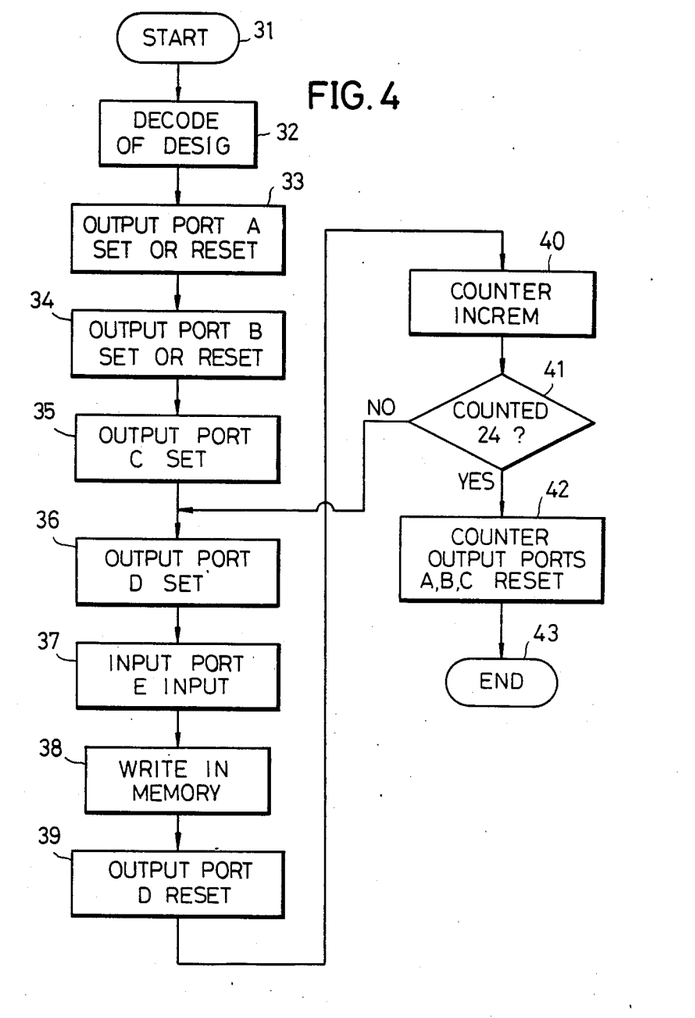
FIG. 4 is a flowchart for explaining the operation of a microcomputer shown in FIG. 1.

The operation of the microcomputer 25 which produces the signals described before, will now be described by referring to a flowchart shown in FIG. 4. When the operation of the microcomputer 25 is started in a step 31, a subsequent step 32 decodes the time or chapter address which is designated through the terminal 26. A step 33 sets or resets the output port A and a step 34 sets or resets the output port B, based on the decoded result in the step 32. Hence, according to the output combinations of "1" and "0" at the output ports A and B, the control circuit 27 determines which switching circuit is to be selectively supplied with the signal from the output port C, while the control circuit 28 determines which data holding circuit is to be selectively supplied with the signal from the output port D. The output port C of the microcomputer 25 is set in a step 35, and the output port D is set in a step 36. Accordingly, the signal from the output port C is supplied to the control circuit 27, and this signal is supplied to the switching circuit which was selected in the control circuit 27 so as to open this selected switching circuit. In the example described before, this selected switching circuit was the switching circuit 23b. In addition, the shift clock pulse b from the output port D is supplied to the control circuit 28, and this clock pulse b is supplied to the data holding circuit which was selected in the selected data holding circuit. In the example described before, this selected data holding circuit was the data holding circuit 24b.

One bit of the address data which is read out from the selected data holding circuit, is supplied to the microcomputer 25 through the input port E in a step 37. This one bit of the address signal is written into a memory within the microcomputer 25, in a step 38. The output port D is reset in a subsequent step 39, and the shift clock pulse b is no longer produced through the output port D. A count in a counter within the microcomputer 25, is incremented by one at a step 40. A step 41 discriminates whether the count in this counter has reached the value 24. If the discrimination result in the step 41 is "NO", the operation returns to the step 36 to read out another bit of the address data, and the count in the counter is again incremented by one. When these operations are repeated and the 24 bits of address data read out from the data holding circuit 24b are written into the memory within the microcomputer 25, the discrimination result in the step 41 becomes "YES". When the discrimination result in the step 41 becomes "YES", the operation advances to a step 42. The step 42 resets the count in the counter to zero, and resets the output ports A, B, and C. The operation of the microcomputer ends in a step 43.

Figure 5:
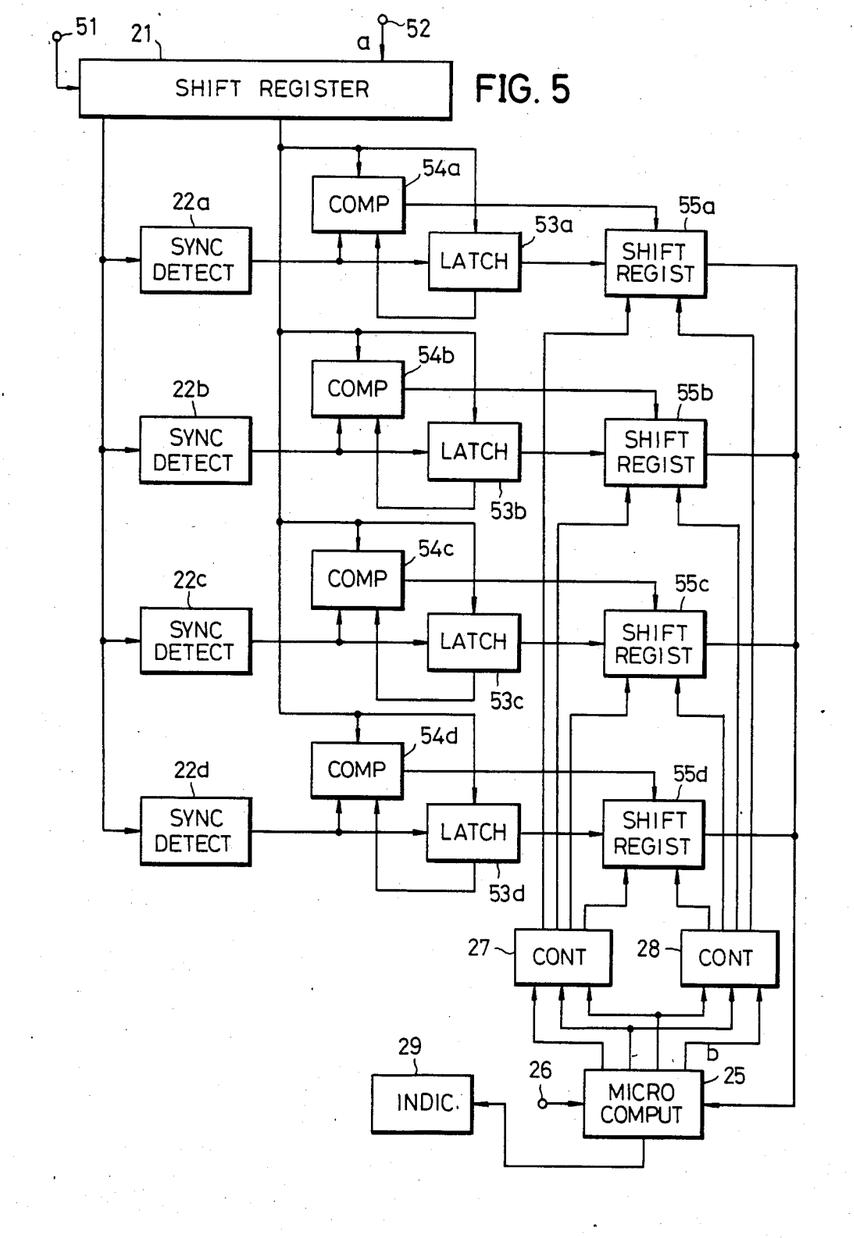
FIG. 5 is a systematic block diagram showing a second embodiment of a data producing device according to the present invention.

Next, description will be given with respect to a second embodiment of the data producing device according to the present invention, by referring to FIG. 5. In FIG. 5, those parts which are the same as those corresponding parts in FIG. 1 are designated by the same reference numerals, and their description will be omitted.

The time code TC and the chapter codes CP-1 through CP-3, are supplied to the shift register through a terminal 51. The clock pulse a is supplied to the shift register 21 through a terminal 52. The synchronizing signals S detected in the synchronizing signal detectors 22a through 22d, are respectively supplied to corresponding latch circuits 53a through 53d. The latch circuits 53a through 53d respectively latch the address data from the shift register 21. Comparing circuits 54a through 54d respectively compare the address data from the shift register 21 with the address data which have been latched previously in the latch circuits 53a through 53d. When the two address data which are respectively supplied to the latch circuits 53a through 53d coincide, the comparing circuits 54a through 54d respectively supply output signals to shift registers 55a through 55d. When the comparing circuits 54a through 54d respectively supply the output signals to the shift registers 55a through 55d, the address data which have been previously latched in the latch circuits 53a through 53d and supplied to the shift registers 55a through 55d, are transferred to the shift registers 55a through 55d. As described before, the same address data is recorded at fifteen locations for one revolution (in one track turn) of the disc 11. Thus, if there is no error in the reproduced address data, the two input address data of the comparing circuits 54a through 54d differ once at the point when the track turns change. However, the two input address data of the comparing circuits 54a through 54d are the same fourteen times in one track turn, and the address data are respectively latched in the latch circuits 53a through 53d fourteen times in one track turn. On the other hand, when there is an error in the reproduced address data, the two input address data of the comparing circuits 54a through 54d do not coincide, and the address data will not be latched in the latch circuits 53a through 53d. Thus, erroneous data will be prevented from being transferred to the shift registers 55a through 55d.

Suppose that a signal designating the time code TC is supplied to the microcomputer 25 through the terminal 26, for example. In this case, the control circuit 27 selectively supplies the request signal from the microcomputer 25 to the shift register 55a, according to the selection signals from the microcomputer 25. As a result, the transfer of address data from the latch circuit 53a to the shift register 55a is enabled. In addition, the control circuit 28 selectively supplies the shift clock pulse b from the microcomputer 25 to the shift register 55s, according to the selection signals from the microcomputer 25. The address data in the shift register 55a is read out in response to this shift clock pulse b, and the read out address data is supplied to the microcomputer 25.

In this second embodiment, the transfer of address data to a shift register from which the read-out is to be carried out, among the shift registers 55a through 55d, is prohibited, instead of using the switching circuits 23a through 23d as in the first embodiment described previously. According to this second embodiment, it is possible to immediately produce the desired address data, because the latch circuits and shift registers are respectively provided exclusively for each of the kinds of address data.

Figure 6:
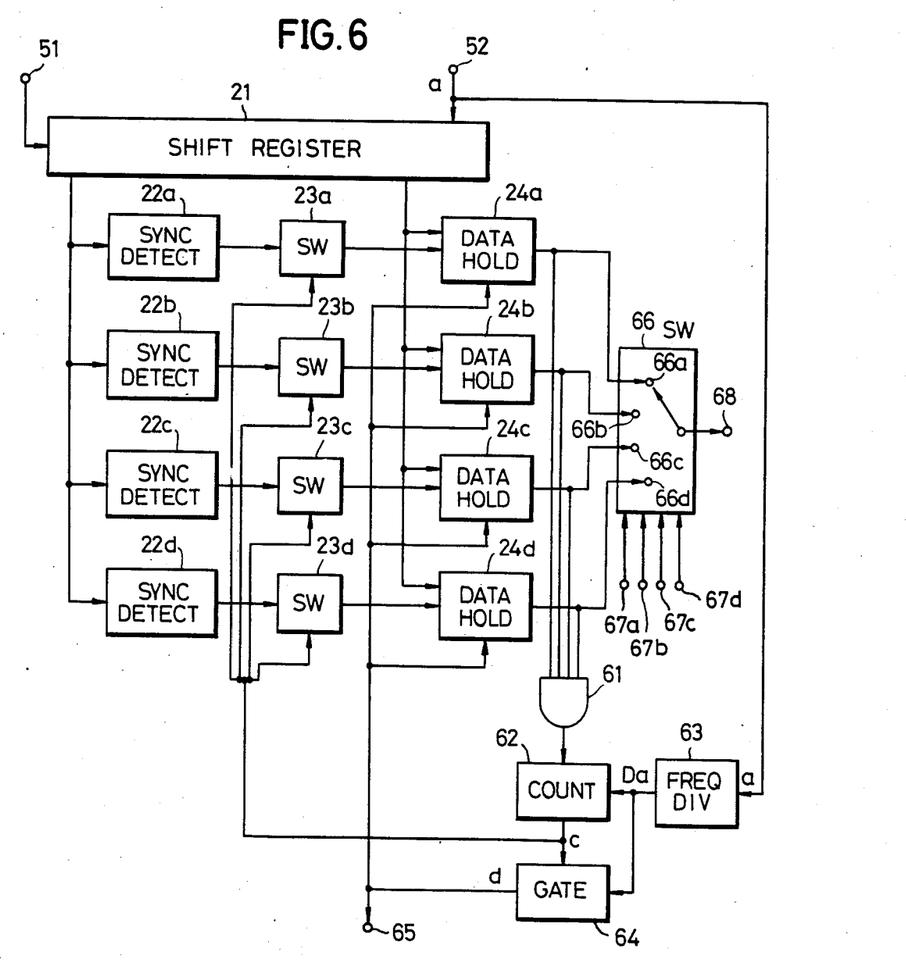
FIG. 6 is a systematic block diagram showing a third embodiment of a data producing device according to the present invention.

A third embodiment of a data producing device according to the present invention, will now be described in conjunction with FIG. 6. In FIG. 6, those parts which are the same as those corresponding parts in FIGS. 1 and 5 are designated by the same reference numerals, and their description will be omitted.

As in the case of the first embodiment, the address data from the shift register 21 are transferred to the data holding circuits 24a through 24d when the synchronizing signals S detected in the synchronizing signal detectors 22a through 22d are supplied to the data holding circuits 24a through 24d. The address data which are transferred to the data holding circuits 24a through 24d, are set so that all of the address data begin with a bit which assumes a level "1". When all of the address data are transferred to the data holding circuits 24a through 24d, the each of the bits at the beginnings of the transferred address data are supplied to a 4-input AND gate 61. That is, each of the bits which assume the level "1", are supplied to the 4-input AND gate 61, and the output signal of the AND gate 61 is supplied to a counter 62.

Figure 7:
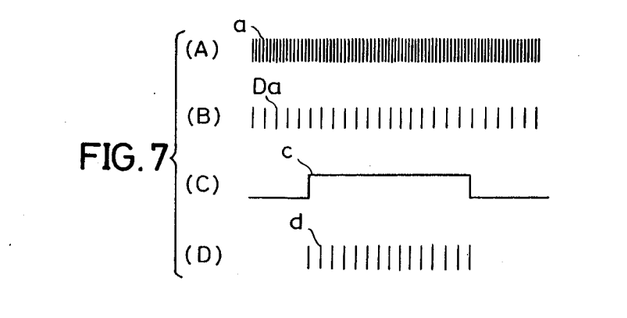
FIGS. 7(A) through 7(D) are graphs respectively showing signal waveforms obtained at each part of the block system shown in FIG. 6.

On the other hand, the clock pulse a shown in FIG. 7(A) from the decoder 16, is supplied to the shift register 21 and to a frequency divider 63, through the terminal 52. The clock pulse a is frequency-divided by $\frac{1}{8}$, and is formed into a pulse $D_a$ shown in FIG. 7(B). The output pulse $D_a$ of the frequency divider 63, is supplied to the counter 62 and to a gate circuit 64. The counter 62 starts to count the pulses from the frequency divider 63, in response to a signal from the AND gate 61. The counter 62 produces a signal c shown in FIG. 7(C) when the count starts, and supplies this signal c to the gate circuit 64 and to the switching circuits 23a through 23d. The gate of the gate circuit 64 is opened by the signal c, and the gate circuit 64 passes the pulse $D_a$ from the frequency divider 63 in this open state. The level of the output signal c of the counter 62 falls at the point when 24 pulses from the frequency divider 63 are counted in the counter 62. Accordingly, the gate circuit 64 passes the output pulse $D_a$ of the frequency divider 63 while the counter 62 is counting up to 24, and a pulse shown in FIG. 7(D) is produced from the gate circuit 64 as a clock pulse d during this counting period. This clock pulse d is supplied to the data holding circuits 24a through 24d and to an output terminal 65. The held address data in the data holding circuits 24a through 24d are respectively read out when the clock pulse d is supplied to these data holding circuits 24a through 24d. In addition, the clock pulse d obtained through the output terminal 65, is supplied to an indicator device (not shown), to drive a shift register within this indicator device.

The signal c is also supplied to the switching circuits 23a through 23d. As a result, the switching circuits 23a through 23d are opened while the clock pulse d is being supplied to the data holding circuits 24a through 24d and the held address data are being read out from the data holding circuits 24a through 24d. Therefore, the synchronizing signals S detected in the synchronizing signal detectors 22a through 22d, are prevented from being supplied to the data holding circuits 24a trough 24d.

The outputs of the data holding circuits 24a through 24d, are respectively supplied to contacts 66a through 66d of a switching circuit 66. When a desired address data is to be produced, a desired selection button among four selection buttons (not shown) is pushed. When this desired selection button is pushed, a signal is applied to a corresponding terminal among terminals 67a through 67d. Thus, the switching circuit 66 is switched over and connected to the contact which corresponds to one of the terminals which is applied with the signal. For example, when the chapter code CP-2 is selected, a signal is applied to the terminal 67c, and the switching circuit 66 is switched over and connected to the contact 66c. As a result, the address data in the chapter code CP-2 obtained from the data holding circuit 24c, passes through the switching circuit 66, and is produced through an output terminal 68. The address data in the chapter code CP-2 which is produced through the output terminal 68, is supplied to the indicator device.

According to this third embodiment, the clock pulse d for carrying out the read-out from the data holding circuits 24a through 24d, is obtained by frequency-dividing the clock pulse a. Thus, unlike in the first and second embodiments described previously, it is unnecessary to use a microcomputer to produce this clock pulse d in this third embodiment.

Figure 8:
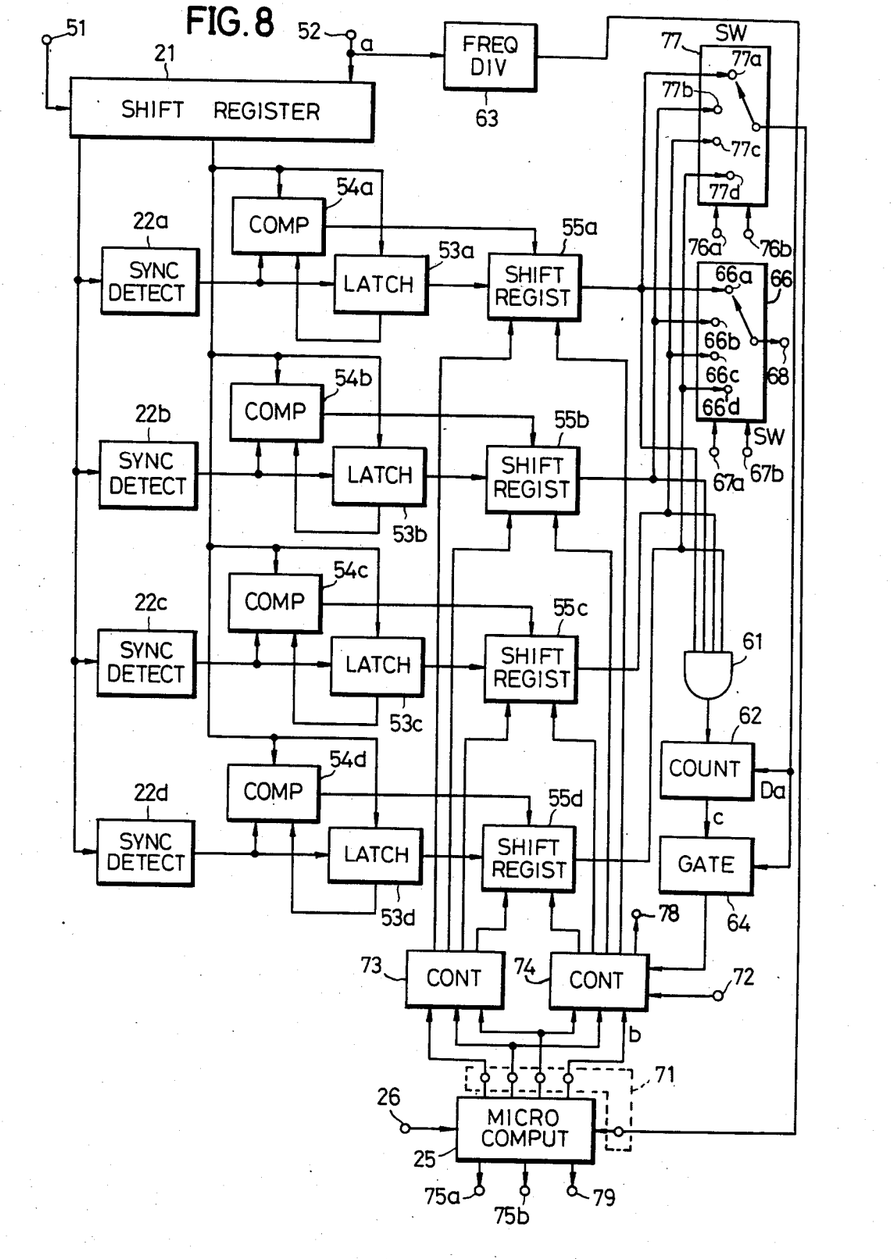
FIG. 8 is a systematic block diagram showing a fourth embodiment of a data producing device according to the present invention.

Next, description will be given with respect to a fourth embodiment of a data producing device according to the present invention, by referring to FIG. 8. In FIG. 8, those parts which are the same as those corresponding parts in FIGS. 5 and 6 are designated by the same reference numerals, and their description will be omitted. This fourth embodiment of the invention is designed so that the pickup device can make access according to an address data which is different from the address data which is being displayed on the indicator device.

When the microcomputer 25 is coupled to control circuits 74 and 75 through terminal means 71, an external mode signal is applied to the control circuit 74 through a terminal 72 so that the signals from the microcomputer 25 will be used. As an example, description will be given for a case where the pickup device is to be moved to a location which is designated by a time code TC, and the indicator device is to simultaneously display a chapter code CP-1. In this case, a signal which makes access to the pickup device, that is, a signal which selects the time code TC, is supplied to the microcomputer 25. In addition, a signal which selectively causes display, that is, a signal which causes display of the chapter code CP-1, is supplied to the microcomputer 25. These signals which are supplied to the microcomputer 25 are decoded, and switching signals are produced through output terminals 75a and 75b. The switching signals are respectively applied to the switching circuit 66 through terminals 67a and 67b, and also to a switching circuit 77 through terminals 76a and 76b. Thus, according to this example, the switching circuit 66 is switched over and connected to the contact 66b. On the other hand, the switching circuit 77 is switched over and connected to a contact 77a.

The control circuit 74 supplies the clock pulse b from the microcomputer 25 to the shift registers 55a and 55b only, according to the selection signals from the microcomputer 25. On the other hand, the control circuit 73 supplies a signal which prohibits transfer of address data to the shift registers 55a and 55b only, according to the selection signals from the microcomputer 25. Hence, the address data are respectively read out from the shift registers 55a and 55b, and are supplied to the switching circuits 77 and 66. The switching circuit 77 is connected to the contact 77a, and the switching circuit 66 is connected to the contact 66b, as described above. Thus, the address data in the time code TC read out from the shift register 55a, is supplied to the microcomputer 25 through the switching circuit 77. Further, the address data in the chapter code CP-1 read out from the shift register 55b, passes through the switching circuit 66, and is supplied to an indicator device (not shown) through the output terminal 68. Moreover, a clock pulse is obtained through a terminal 78 of the control circuit 74, and is applied to a shift register within the indicator device.

Accordingly, an access signal from the microcomputer 25, is supplied to a device which moves the pickup device through a terminal 79. The pickup device is thus moved to the location which was designated by the time code TC. Further, because the address data in the chapter code CP-1 is supplied to the indicator device through the output terminal 68, the indicator device displays the chapter code CP-1 independently of the time code TC which designates the location which is to be accessed by the pickup device. As a result, according to this fourth embodiment, the pickup device can make access according to an address data which is different from the address data which is to be displayed on the indicator device.

In a case where the microcomputer 25 is not coupled to the control circuits 73 and 74 through the terminal means 71, an internal mode signal is applied to the control circuit 74 through the terminal 72. When this internal mode signal is applied to the control circuit 74, the control circuit 74 is switched so as to use the clock pulse from the gate circuit 64 instead of the signals from the microcomputer 25. In this mode, the switching circuit 77 is not used, and the signal obtained through the output terminal 68 is supplied to the indicator device for display. In this case, the clock pulse from the gate circuit 64 is obtained through the terminal 78 of the control circuit 74, and is supplied to the indicator device.

Further, the present invention is not limited to these embodiments, but various variations and modifications may be made without departing from the scope of the present invention.

What is claimed is:

1. A data producing device in a signal reproducing apparatus, said reproducing apparatus reproducing codes and synchronizing signals for discriminating said codes, both of which have been time-sequentially recorded on a recording medium together with an information signal, said codes indicating recorded positions of a plurality of programs, said data producing device comprising:

shift register means supplied with synchronizing signals and codes which are time-sequentially reproduced from the recording medium, said reproduced synchronizing signals and codes being transferred to said shift register means, and being read out from said shift register means in response to a clock pulse having a predetermined frequency a;

a plurality of synchronizing signal detectors supplied with the synchronizing signals from said shift register means, the number of said synchronizing signal detectors beting equal to the number of kinds of said synchronizing signals, said synchronizing signal detectors being provided in parallel with respect to each other and each of said synchronizing signal detectors detecting a specific synchronizing signal;

a plurality of data transfer means provided in parallel with respect to each other and in series with said synchronizing signal detectors, a data in a predetermined code among the codes supplied to said plurality of data transfer means being transferred to said plurality of data transfer means when a synchronizing signal for discriminating said predetermined code is detected in said synchronizing signal detectors and supplied to said plurality of data transfer means; and control means for controlling said plurality of data transfer means so that a data is selectively read out and produced from a desired data transfer means among said plurality of data transfer means, said control means comprising frequency dividing means supplied with the clock pulse having said predetermined frequency a, for frequency-dividing said predetermined frequency a, means for supplying a specific number of output pulses of said frequency dividing means to all of said plurality of data transfer means so as to read out data from said plurality of data transfer means, and for prohibiting data transfer to said plurality of data transfer means while the data are being read out from said plurality of said transfer means, and means for selectively producing a data read out from a desired data transfer means among the data read out from said plurality of data transfer means.

2. A data producing device as claimed in claim 1 in which said control means comprises a plurality of normally-closed switching circuits respectively coupled between said synchronizing signal detectors and said plurality of data transfer means, and means for opening a switching circuit which is coupled to said selected desired data transfer means so as to prohibit a synchronizing signal from being supplied to said selected desired data transfer means.

3. A data producing device as claimed in claim 1 in which said control means comprises means for controlling said plurality of data transfer means so that data are read out from a desired plurality of data transfer means among said plurality of data transfer means, and selecting means for independently producing said data which are read out from said desired plurality of data transfer means.

4. A data producing device as claimed in claim 1 in which said plurality of data transfer means comprises a plurality of latch circuits which are respectively coupled to said synchronizing signal detectors, each latch circuit latching data from said shift register means when supplied with a synchronizing signal which is detected in a corresponding synchronizing signal detector, and a plurality of shift registers which are respectively coupled to said latch circuits, data latched in said latch circuits being entered into said shift registers.

5. A data producing device as claimed in claim 4 in which each of said plurality of data transfer means further comprises a comparing circuit which is supplied with data from said shift register means and data latched in one of said latch circuits, said comparing circuit controlling one of said shift registers so that latched data in said one latch circuit is entered into said one shift register when the two data being compared in said comparing circuit coincide.

* * * * *